United States Patent
Wu et al.

(10) Patent No.: US 12,225,625 B2
(45) Date of Patent: Feb. 11, 2025

(54) METHOD AND APPARATUS FOR RADIO ACCESS NETWORK BASED NOTIFICATION AREA UPDATE

(71) Applicant: Lenovo (Beijing) Ltd., Beijing (CN)

(72) Inventors: Lianhai Wu, Chaoyang (CN); Jie Shi, Haidian District (CN); Haiming Wang, Xicheng District (CN); Jing Han, Chaoyang District (CN); Jie Hu, Changping District (CN)

(73) Assignee: Lenovo (Beijing) Ltd., Beijing (CN)

( * ) Notice: Subject to any disclaimer, the term of this patent is extended or adjusted under 35 U.S.C. 154(b) by 450 days.

(21) Appl. No.: 17/775,774

(22) PCT Filed: Nov. 22, 2019

(86) PCT No.: PCT/CN2019/120315
§ 371 (c)(1),
(2) Date: May 10, 2022

(87) PCT Pub. No.: WO2021/097811
PCT Pub. Date: May 27, 2021

(65) Prior Publication Data
US 2022/0417728 A1    Dec. 29, 2022

(51) Int. Cl.
*H04W 8/18* (2009.01)
(52) U.S. Cl.
CPC .................. *H04W 8/183* (2013.01)
(58) Field of Classification Search
CPC .................................... H04W 8/183
USPC ............. 455/419, 418, 412.1, 410, 558
See application file for complete search history.

(56) References Cited

U.S. PATENT DOCUMENTS

| | | | |
|---|---|---|---|
| 2017/0359813 A1 | 12/2017 | Lee | |
| 2018/0220344 A1* | 8/2018 | Shaheen | H04W 36/0085 |
| 2019/0150221 A1 | 5/2019 | Tseng et al. | |
| 2020/0120499 A1* | 4/2020 | Norrman | H04L 63/061 |

(Continued)

FOREIGN PATENT DOCUMENTS

| | | |
|---|---|---|
| CN | 110012477 A | 7/2019 |
| WO | 2018171724 A1 | 9/2018 |
| WO | 2019161544 A1 | 8/2019 |

OTHER PUBLICATIONS

Ericsson, "Optional parameters of SuspendConfig", 3GPP TSG RAN WG2 #AH 1807, Tdoc R2-1809705, Montreal, Canada [retrieved Aug. 1, 2022]. Retrieved from the Internet <https://www.3gpp.org/ftp/TSG_RAN/WG2_RL2/TSGR2_AHs/2018_07_NR/Docs/>., Jul. 2018, 2 Pages.

(Continued)

*Primary Examiner* — Nghi H Ly
(74) *Attorney, Agent, or Firm* — FIG. 1 Patents

(57) ABSTRACT

The present disclosure relates to methods and apparatuses. According to some embodiments of the disclosure, a method includes: selecting a first subscriber identity module from a plurality of subscriber identity modules of a user equipment; and transmitting a resume request message via the first subscriber identity module, wherein the resume request message comprises first radio access network (RAN)-based notification area (RNA) update information associated with the first subscriber identity module and second RNA update information associated with a second subscriber identity module of the plurality of subscriber identity modules.

20 Claims, 10 Drawing Sheets

(56) References Cited

U.S. PATENT DOCUMENTS

2020/0145921 A1* 5/2020 Zhang .............. H04W 52/0235
2020/0163149 A1* 5/2020 Mildh ................ H04W 68/005

OTHER PUBLICATIONS

PCT/CN2019/120315, "International Preliminary Report on Patentability", PCT Application No. PCT/CN2019/120315, Jun. 2, 2022, 6 pages.
PCT/CN2019/120315, "International Search Report and Written Opinion", PCT Application No. PCT/CN2019/120315, Aug. 27, 2020, 8 pages.
Vivo, "Considerations on multi-SIM study in RAN", 3GPP TSG RAN Meeting #84, RP-191304, Newport Beach, USA [retrieved Aug. 1, 2022]. Retrieved from the Internet <https://www.3gpp.org/ftp/tsg_ran/TSG_RAN/TSGR_84/Docs>., Jun. 2019, 7 Pages.
Vivo, "On NR UE power saving", 3GPP TSG RAN WG1 #94, R1-1808252 Gothenburg, Sweden [retrieved Aug. 1, 2022]. Retrieved from the Internet <https://www.3gpp.org/ftp/TSG_RAN/WG1_RL1/TSGR1_94/Docs/>., Aug. 2018, 8 Pages.
Vivo (Moderator), "Report of phase 1 Multi-SIM email discussion", 3GPP TSG-RAN WG Meeting #85 RP-191898 Newport Beach, USA [retrieved Jul. 28, 2022]. Retrieved from the Internet <https://www.3gpp.org/ftp/tsg_ran/TSG_RAN/TSGR_85/Docs>., Sep. 2019, 36 Pages.

* cited by examiner

METHOD AND APPARATUS FOR RADIO ACCESS NETWORK BASED NOTIFICATION AREA UPDATE

TECHNICAL FIELD

Embodiments of the present disclosure generally relate to wireless communication technology, and more particularly to Radio Access Network (RAN) based Notification Area Update (RNAU) in a wireless communication system.

BACKGROUND

A wireless communication device (e.g., a cell phone, a tablet, a laptop, an Internet-of-Things (IoT) device, etc.), which may include two or more Subscriber Identity Modules (SIMS), can be referred to as a multi-SIM wireless communication device.

Generally, a SIM may correspond to at least one subscription in an environment where Radio Access Technology (RAT) is adopted. For example, a multi-SIM wireless communication device may have a first SIM associated with a first subscription and a second SIM associated with a second subscription. The first SIM and the second SIM may share the same hardware component(s), e.g., Radio Frequency (RF) component(s) or baseband component(s). During a specific time period, a multi-SIM wireless communication device with a single Transmit/Receive (TX/RX) chain may monitor only a single wireless network.

There is a need for handling communications between a multi-SIM wireless communication device and networks or Base Stations (BSs) in a wireless communication system.

SUMMARY OF THE DISCLOSURE

Some embodiments of the present disclosure provide a method. The method may include: selecting a first subscriber identity module from a plurality of subscriber identity modules of a user equipment, wherein the plurality of subscriber identity modules are in an inactive state; and transmitting a resume request message via the first subscriber identity module, wherein the resume request message comprises first radio access network (RAN)-based notification area (RNA) update information associated with the first subscriber identity module and second RNA update information associated with a second subscriber identity module of the plurality of subscriber identity modules.

In some embodiments of the present disclosure, the first subscriber identity module is selected based on the first subscriber identity module having the best channel qualities among channel qualities associated with the plurality of subscriber identity modules.

In some embodiments of the present disclosure, the second RNA update information may include at least one of the following: a resume ID of the second subscriber identity module; an authentication token of the second subscriber identity module; a serving cell ID of the second subscriber identity module; and a resume cause associated with the second subscriber identity module. The serving cell ID may be physical cell identifier (PCI) or evolved universal terrestrial radio access network (E-UTRAN) cell global identifier (ECGI).

In some embodiments of the present disclosure, the second RNA update information may further include one of the following: configured RNA information associated with the second subscriber identity module; and a periodical RNA update indicator associated with the second subscriber identity module.

In some embodiments of the present disclosure, the second RNA update information may include at least one of the following: a resume ID of the second subscriber identity module; an authentication token of the second subscriber identity module; a periodical RNA update indicator associated with the second subscriber identity module; and a resume cause associated with the second subscriber identity module.

In some embodiments of the present disclosure, the resume cause indicates RNA update or periodical RNA update.

In some embodiments of the present disclosure, the method may further include: receiving a resume response message via the first subscriber identity module, wherein the resume response message may include second resume response information associated with the second subscriber identity module. The second resume response information may include a suspend configuration for the second subscriber identity module or a connection setup indication for the second subscriber identity module. The suspend configuration for the second subscriber identity module may include at least one of the following: a full length of a resume ID of the second subscriber identity module; a short length of the resume ID of the second subscriber identity module; a paging cycle associated with the second subscriber identity module; RNA information associated with the second subscriber identity module; a timer value of a periodical RNA update timer associated with the second subscriber identity module; and a next hop chaining count associated with the second subscriber identity module. The resume ID may be allocated by a serving base station of the second subscriber identity module or the last serving base station of the second subscriber identity module.

Some embodiments of the present disclosure provide a method. The method may include: receiving a resume request message from a user equipment at a first base station, wherein the message may include first radio access network (RAN)-based notification area (RNA) update information associated with a first subscriber identity module of the user equipment served by the first base station and second RNA update information associated with a second subscriber identity module of the user equipment.

In some embodiments of the present disclosure, the method may further include transmitting a RNA update indication associated with the second subscriber identity module to a second base station currently serving the second subscriber identity module; and receiving a RNA update response from the second base station.

In some embodiments of the present disclosure, the second RNA update information may include at least one of the following: a resume ID of the second subscriber identity module; an authentication token of the second subscriber identity module; a serving cell ID of the second subscriber identity module; and a resume cause associated with the second subscriber identity module. The serving cell ID may be physical cell identifier (PCI) or evolved universal terrestrial radio access network (E-UTRAN) cell global identifier (ECGI). The RNA update indication associated with the second subscriber identity module may include at least one of the following: the resume ID of the second subscriber identity module; the authentication token of the second subscriber identity module; and the resume cause associated with the second subscriber identity module.

In some embodiments of the present disclosure, the second RNA update information may further include one of the following: configured RNA information associated with the second subscriber identity module; and a periodical RNA update indicator associated with the second subscriber identity module. The RNA update indication associated with the second subscriber identity module may include at least one of the following: the resume ID of the second subscriber identity module; the authentication token of the second subscriber identity module; the resume cause associated with the second subscriber identity module; and the configured RNA information or the periodical RNA update indicator.

In some embodiments of the present disclosure, the method may further include transmitting a RNA update indication associated with the second subscriber identity module to a third base station last serving the second subscriber identity module; and receiving a RNA update response from the third base station. The second RNA update information may include at least one of the following: a resume ID of the second subscriber identity module; an authentication token of the second subscriber identity module; a periodical RNA update indicator associated with the second subscriber identity module; and a resume cause associated with the second subscriber identity module. The RNA update indication may include the second RNA update information.

In some embodiments of the present disclosure, the resume cause indicates RNA update or periodical RNA update.

In some embodiments of the present disclosure, the RNA update response may include a suspend configuration for the second subscriber identity module or a connection setup indication for the second subscriber identity module. The method may further include transmitting the suspend configuration for the second subscriber identity module or the connection setup indication for the second subscriber identity module to the first subscriber identity module. The suspend configuration may include at least one of the following: a full length of a resume ID of the second subscriber identity module; a short length of the resume ID of the second subscriber identity module; a paging cycle associated with the second subscriber identity module; RNA information associated with the second subscriber identity module; a timer value of a periodical RNA update timer associated with the second subscriber identity module; and next hop chaining count associated with the second subscriber identity module. The resume ID may be allocated by a base station currently serving the second subscriber identity module or a base station last serving the second subscriber identity module.

Some embodiments of the present disclosure provide a method. The method may include: transmitting an assistant information report via a first subscriber identity module of a user equipment, wherein the assistant information report may include time information of a periodical radio access network (RAN)-based notification area (RNA) update associated with a second subscriber identity module of the user equipment.

In some embodiments of the present disclosure, the time information may include: a periodicity value of a periodical RNA update timer associated with the second subscriber identity module; and starting time of the periodical RNA update timer associated with the second subscriber identity module. In some embodiments of the present disclosure, the method may further include receiving a radio resource control (RRC) release message including suspend configuration for the first subscriber identity module, wherein the suspend configuration may include a periodicity value of a periodical RNA update timer associated with the first subscriber identity module, and wherein the periodicity value of the periodical RNA update timer associated with the first subscriber identity module may be determined based on the time information. The first subscriber identity module may be in a connected state and the second subscriber identity module may be in an inactive state. In some embodiments of the present disclosure, the method may further include selecting the first subscriber identity module from a plurality of subscriber identity modules in an inactive state; and switching the first subscriber identity module from an inactive state to a connected state.

Some embodiments of the present disclosure provide a method. The method may include: receiving an assistant information report from a user equipment at a base station serving a first subscriber identity module of the user equipment, wherein the assistant information report may include time information of a periodical radio access network (RAN)-based notification area (RNA) update associated with a second subscriber identity module of the user equipment. The time information may include: a periodicity value of a periodical RNA update timer associated with the second subscriber identity module; and a starting time of the periodical RNA update timer associated with the second subscriber identity module.

In some embodiments of the present disclosure, the method may further include: transmitting a radio resource control (RRC) release message including suspend configuration for the first subscriber identity module, wherein the suspend configuration may include a periodicity value of a periodical RNA update timer associated with the first subscriber identity module, and wherein the periodicity value of the periodical RNA update timer associated with the first subscriber identity module may be determined based on the time information.

Some embodiments of the present disclosure provide a method. The method may include: receiving a radio resource control (RRC) release message including suspend configuration for a subscriber identity module of a user equipment, wherein the suspend configuration may include a time value that a periodical radio access network (RAN)-based notification area (RNA) update associated with the subscriber identity module may be allowed to be postponed. The method may further include: switching the subscriber identity module from a connected state to an inactive state based on the suspend configuration.

Some embodiments of the present disclosure provide a method. The method may include: transmitting a radio resource control (RRC) release message including suspend configuration for a subscriber identity module of a user equipment, wherein the suspend configuration may include a time value that a periodical radio access network (RAN)-based notification area (RNA) update associated with the subscriber identity module may be allowed to be postponed.

Some embodiments of the present disclosure provide an apparatus. According to some embodiments of the present disclosure, the apparatus may include: at least one non-transitory computer-readable medium having computer executable instructions stored therein; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions are configured to, with the at least one processor, to cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Figure 1:
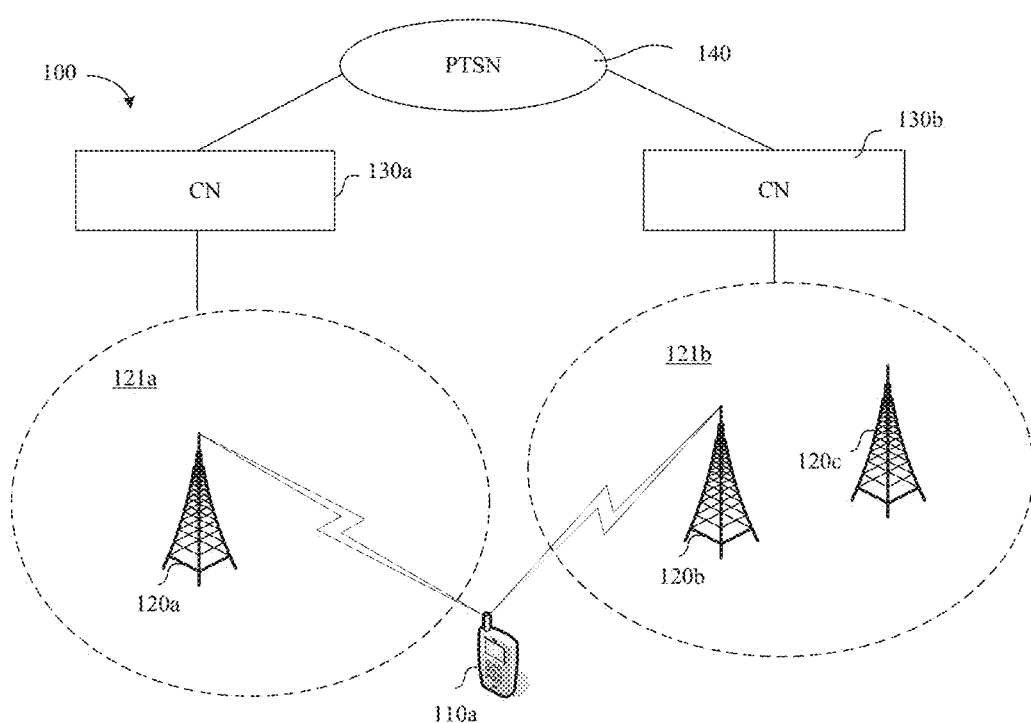
FIG. 1 illustrates a schematic wireless communication system according to some embodiments of the present disclosure.

FIG. 1 illustrates a wireless communication system 100 according to some embodiments of the present disclosure.

Referring to FIG. 1, a wireless communication system 100 may include one or more Wireless Communication Devices (WCDs), e.g. WCD 110a, one or more BSs, e.g., BS 120a, BS 120b, and BS 120c, one or more Radio Access Networks (RANs), e.g., RAN 121a and RAN 121b, one or more Core Networks (CNs), e.g., CN 130a and CN 130b, and a Public Switched Telephone Network (PSTN), e.g., PSTN 140. It is contemplated that the wireless communication system 100 may include any number of wireless communication devices, BSs, networks, and/or network components.

Each of the BS 120a, BS 120b, and BS 120c may be any type of device configured to wirelessly interface with at least one WCD (e.g., WCD 110a) to facilitate access to one or more communication networks, such as the CN 130a and/or CN 130b. Each of the BS 120a, BS 120b, and BS 120c may operate, for example based on a standard protocol such as Long-Term Evolution (LTE), LTE-Advanced (LTE-A), New Radio (NR), or other suitable protocol(s). For example, the BS 120a, BS 120b, and BS 120c may include an eNB or a gNB. Persons skilled in the art should understand that as the 3rd Generation Partnership Project (3GPP) and communication technology develop, the terminologies recited in the specification may change, which should not affect the principle of the disclosure.

BS 120a may be part of RAN 121a, which may also include other BSs and/or network elements (not shown), such as a Base Station Controller (BSC), a Radio Network Controller (RNC), and relay nodes. Also, BS 120b and BS 120c may be part of RAN 121b that in addition, may also include other BSs and/or network elements (not shown in FIG. 1). Each of the BS 120a, BS 120b, and BS 120c may be configured to transmit and/or receive wireless signals within a particular geographic region, which may be referred to as a cell (not shown in FIG. 1).

RAN 121a may be in communication with the CN 130a, and the RAN 121b may be in communication with the CN 130b. The RAN 121a and the RAN 121b may employ the same or different Radio Access Technologies (RATs). For example, RAN 121a may employ an Evolved Universal Terrestrial Radio Access Network (E-UTRAN) radio technology, and the RAN 121b may employ a NR radio technology. Each of the CN 130a and CN 130b may include a plurality of core network components, such as a Mobility Management Entity (MME) (not shown in FIG. 1) or an Access and Mobility Management Function (AMF) (not shown in FIG. 1). The CNs may serve as a gateway for the WCDs to access the PTSN 140 and/or other networks (not shown in FIG. 1).

A WCD 110a may be any type of device configured to operate and/or communicate in a wireless environment. For example, the WCD 110a may include a User Equipment (UE), a mobile station, a fixed or mobile subscriber unit, a pager, a cellular phone, a personal digital assistant, a smartphone, a laptop, a netbook, personal computer, a wireless sensor, consumer electronics, a smart watch and the like. Persons skilled in the art should understand that as technology develops and advances, the terminologies described in the present disclosure may change, but should not affect or limit the principles and spirit of the present disclosure.

WCD 110a may include one or more Subscriber Identity Modules (SIMS that enable WCD 110a to access one or more separate wireless communication networks. As shown in FIG. 1, the WCD 110a may be configured to access either RAN 121a through BS 120a by a SIM A (not shown in FIG. 1) in WCD 110a or RAN 121b through the BS 120b by a SIM B (not shown in FIG. 1) in WCD 110a. While the WCD 110a is shown connected to the RAN 121a and the RAN 121b, in other examples (not shown), the WCD 110a may establish additional network connections using additional RATs.

Each of SIM A and SIM B may associate with one kind of wireless communication system. For example, either the SIM A or SIM B may be represented by a SIM card corresponding to a GSM system, a Universal Subscriber Identity Module (USDA) card corresponding to a UMTS system, a Removable User Identity Module (RUIM) card or a Code Division Multiple Access (CDMA) Subscriber Identity Module (CSIM) card corresponding to the CDMA2000 communication system, a Universal Integrated Circuit Card (UICC) corresponding to 5G (or NR) communication system, a wireless network card corresponding to IEEE 802.11x wireless local area network (WLAN), or other suitable modules that can identify the subscribers.

A WCD that includes a plurality of SIMs and connects to two or more networks with two or more SIMs being active at a given time may be a Multi-SIM-Multi-Active (MSMA) communication device. An example MSMA communication device may be a Dual-SIM-Dual-Active (DSDA) communication device, which may include two SIMs. Both SIMs may remain active.

On the other hand, a WCD provided with a plurality of SIMs and connected to two or more networks with one SIM being active at a given time is a Multi-SIM-Multi-Standby (MSMS) communication device. An example of the MSMS communication device may be a Dual-SIM-Dual-Standby (DSDS). A DSDS communication device may include two SIMs, and may use a single radio front-end and baseband to register the communication device to a single (the same) Public Land Mobile Network (PLMN) or to two different PLMNs with the two SIMs, respectively.

In a multi-SIM wireless communication device, e.g., a MSMS communication device, a plurality of SIMs may share a common set of Radio Frequency (RF) resources (such as a RF transceiver) of the wireless communication device. However, embodiments described herein may also be applicable to multi-SIM wireless communication devices in which each of the plurality of SIMs is associated with a separate RF resource with one of the plurality of SIMs being active while the rest are deactivated. For example, a DSDS communication device may support a subscription service #A enabled by a SIM A and a subscription service #B enabled by a SIM B. Only one of the subscription service #A and subscription service #B may use RF resources to communicate with the corresponding wireless network at a time.

According to the 3rd Generation Partnership Project (3GPP), from a perspective of a network, a UE (e.g., WCD 110a in FIG. 1) may be in one of the following states: RRC-IDLE state, RRC_CONNECTED state, and RRC_INACTIVE state, at a given time. In RRC_INACTIVE state, a UE does not have a RRC connection with the Radio Access Network (RAN). However, the RAN keeps a connection with the core network for the UE. Therefore, RRC_INACTIVE state may achieve power saving with acceptable access latency. The specific characteristics of RRC-IDLE state, RRC_CONNECTED state, and RRC_INACTIVE state are defined in 3GPP specifications. A UE may be in an idle mode corresponding to the RRC_IDLE state, an inactive mode corresponding to the RRC_INACTIVE state, or a connected mode corresponding to the RRC_CONNECTED state. For example, referring to FIG. 1, from the perspective of RAN 121a (or BS 120a), the WCD 110a may be in an inactive mode; or from the perspective of RAN 121b (or BS 120b), the WCD 110a may be in an inactive mode.

A WCD staying at inactive mode may need to perform a RAN-based Notification Area (RNA) update periodically (hereinafter, "periodical RNA update") or when the WCD moves out of a configured RNA (that is, triggered by a RNA change). RNA may allow base station to know the rough location of a WCD that is in an inactive mode (inactive WCD). The RNA may include one or more cells or one or more RAN areas, and may be configured by a RAN node (e.g., a base station) to a WCD using, for example, dedicated signaling or message broadcasting. The RAN node may trigger a paging procedure for an inactive WCD within the WCD's RNA when the RAN wants to exchange data or control signaling with the inactive WCD. Therefore, it is important for the RAN to be aware of the inactive WCD moving out of the configured RNA. Hence, a solution is required to handle RNA updates for a multi-SIM wireless communication device.

Moreover, for a multi-SIM wireless communication device, it can be possible that at a certain time, two or more subscription services (e.g., SIM A and SIM B of WCD 110a in FIG. 1) may need to use the same RF resources to communicate with their respective wireless networks at a same time, in which case, the RNA update associated with the two or more subscription services may collide, resulting in a "RNA update collision." For example, referring to FIG. 1, a RNA update collision may occur at the WCD 110a, when both the subscription service #A (corresponding to SIM A) and the subscription service #B (corresponding to SIM B) may try to access a RF transceiver of the WCD 110a to perform RNA update simultaneously. Hence, a solution is required to handle RNA update collisions for a multi-SIM wireless communication device.

Embodiments of the present disclosure propose technical solutions for handling RNA updates in the new generation communication systems, such as a 5G communication system. More details on the embodiments of the present disclosure will be illustrated in the following text in combination with the appended drawings.

Figure 2:
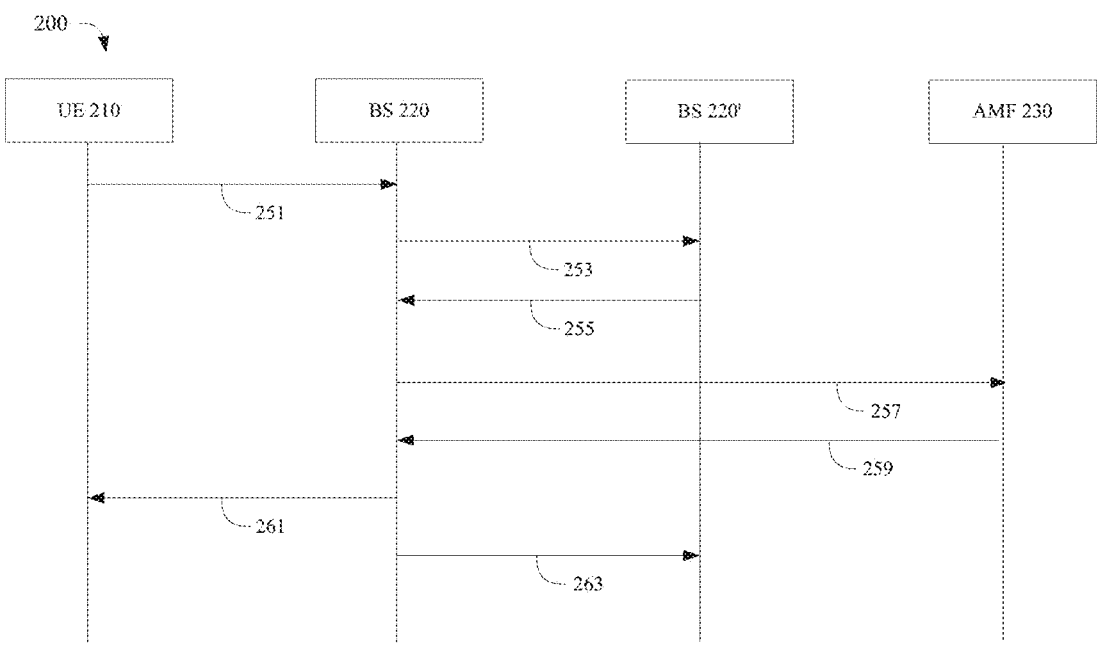
FIG. 2 illustrates a flow chart of an exemplary procedure of performing RAN-Based Notification Area update according to some embodiments of the present disclosure.

FIG. 2 illustrates a flow chart of an exemplary procedure 200 of performing a RNA update for a communication device according to some embodiments of the present disclosure. The exemplary procedure 200 is applicable to the above-mentioned two types of RNA update, i.e., a RNA update triggered by a RNA change and a periodical RNA update, and other types of a RNA update.

Referring to FIG. 2, at the beginning, UE 210 may communicate with a base station, e.g., BS 220', which is the serving base station or currently serving base station of UE 210. In some embodiments of the present disclosure, the UE 210 may perform a RNA update procedure when it moves out of the coverage of BS 220', and may switch to a new base station, e.g., BS 220 which is not within the configured RNA. Accordingly, the serving base station of UE 210 will change from BS 220' to BS 220, that is, the BS 220' becomes the last serving base station of UE 210, while BS 220 becomes the serving base station or currently serving base station of UE 210. As mentioned above, the configured RNA may indicate a list of cells or a list of RAN area IDs, depending on the configuration of the last serving base station. A RAN area may be a subset of a CN Tracking Area or equal to a CN Tracking Area. A RAN area may be identified by a RAN area ID. A RAN area ID may include a TAC, and may optionally include a RAN area code. In some embodiments of the present disclosure, the UE 210 may perform a RNA update procedure when a periodical RNA update timer expires.

In operation 251, the UE 210 may transmit a RRC connection resume request to the new base station (e.g., the BS 220). In some embodiments of the present disclosure, the resume request may include a cause value indicating RNA update (either a RNA update triggered by a RNA change or a periodical RNA update). In some embodiments of the present disclosure, the resume request may include the identity of the UE 210. The identity of the UE 210 may be a resume ID configured by the last serving base station (e.g., the BS 220') in a RRC release message. The resume ID may include information regarding the last serving base station (e.g., the BS 220'). In some embodiments of the present disclosure, a resume ID may include an Inactive-Radio Network Temporary identifier (I-RNTI).

In operation 253, the BS 220 may transmit a request for acquiring the UE context of the UE 210 to the last serving base station (e.g., BS 220') of the UE 210. In some embodiments of the present disclosure, the request for acquiring the UE context may include the identity of the UE 210. In some embodiments of the present disclosure, the request for acquiring the UE context may include the cause value received from the UE 210. In operation 255, the last serving base station BS 220' may transmit the UE context of the UE 210 to the BS 220. In some embodiments of the present disclosure, in the case that the RNA update is triggered by a RNA change, the BS 220' always determines to relocate the UE context of the UE 210. In the case of a periodical RNA update, the BS 220' may determine to relocate or not relocate the UE context of the UE 210.

In operations 257 and 259, the BS 220 may perform a path switch procedure for the UE 210. In operation 257, the BS 220 may transmit a path switch request for the UE 210 to the core network (e.g., AMF 230). In operation 259, the AMF 230 may transmit a path switch request response to the BS 220. The path switch request response may include the identity of the UE 210.

In operation 261, the BS 220 may transmit a RRC release message to the UE 210 in the case that the BS 220 determines to send the UE 210 to an inactive state. The RRC release message may include suspend configuration. The suspend configuration may include at least one of the following: a full length of a resume ID, a short length of the resume ID, a paging cycle, RNA information, a timer value of a periodical RNA update timer, and a next hop chaining count. The definitions for the above parameters are defined in the 3GPP technical specification TS 38.331. The resume ID (e.g., I-RNTI) may be allocated by BS 220. In some other embodiments of the present disclosure, the BS 220 may determine to send the UE 210 to a connected state, and may transmit a connection setup message to the UE 210 in operation 261. In operation 263, the BS 220 may transmit a UE context release message to the BS 220'. The release message may trigger the release of UE resources for the UE 210 at the BS 220.

In some embodiments of the present disclosure, the UE 210 may function as the WCD 110a in FIG. 1. The BS 220 and BS 220' may function as the BS 120a, BS 120b, or BS 120c in FIG. 1. In some example, referring to FIG. 1, from the perspective of RAN 121a (or BS 120a), the WCD 110a may be in an inactive mode. The WCD 110a may perform the above RNA update procedure via a SIM (e.g., SIM A) associated with RAN 121a. In some example, from the perspective of RAN 121b (or BS 120b), the WCD 110a may be in an inactive mode. The WCD 110a may perform the above RNA update procedure via a SIM (e.g., SIM B) associated with RAN 121b.

It should be appreciated by persons skilled in the art that the sequence of the operations in exemplary procedure 200 may be changed and some of the operations in exemplary procedure 200 may be eliminated or modified, without departing from the spirit and scope of the disclosure.

Figure 3:
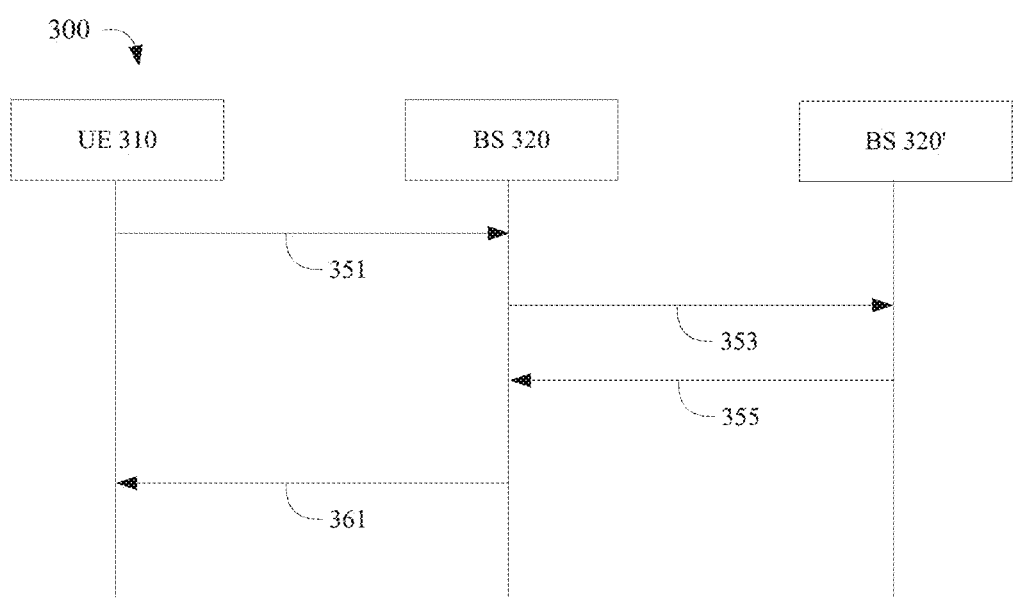
FIG. 3 illustrates a flow chart of an exemplary procedure of performing RAN-Based Notification Area update according to some embodiments of the present disclosure.

FIG. 3 illustrates a flow chart of an exemplary procedure 300 of performing a RNA update for a communication device according to some embodiments of the present disclosure. The exemplary procedure 300 is applicable to, for example, a periodical RNA update. Details described in all the foregoing embodiments of the present disclosure are applicable for the embodiments shown in FIG. 3.

Referring to FIG. 3, at the beginning, UE 310 may communicate with a base station (e.g., BS 320'). As the UE moves, the UE 310 may switch from the currently serving, e.g., BS 320', to a new base station, e.g., BS 320, which is within the configured RNA. Accordingly, the serving base station will change from BS 320' to BS 320, that is, the BS 320' becomes the last serving base station of UE 310, while BS 320 becomes the serving base station or currently serving base station of UE 310. The UE 310 may perform a RNA update procedure when a periodical RNA update timer expires.

In operation 351, the UE 310 may transmit a RRC connection resume request to the BS 320. In some embodiments of the present disclosure, the resume request may include a cause value indicating RNA update. In some embodiments of the present disclosure, the resume request may include the identity of the UE 310. The identity of the UE 310 may be a resume ID configured by the last serving base station (e.g., the BS 320') in a RRC release message. The resume ID may include information regarding the last serving base station (e.g., the BS 320'). In some embodiments of the present disclosure, a resume ID may include an Inactive-Radio Network Temporary Identifier (I-RNTI).

In operation 353, the BS 320 may transmit a request for acquiring the UE context of the UE 310 to the last serving base station (e.g., BS 320') of the UE 310. In some embodiments of the present disclosure, the request for acquiring the UE context may include the identity of the UE 310. In some embodiments of the present disclosure, the request for acquiring the UE context may include the cause value received from the UE 310.

After receiving request for acquiring the UE context, BS 320' may determine not to relocate the UE context. BS 320' may store information, for example, Cell-Radio Network Temporary Identifier and PCI related to the resumption cell, to be used in a next resume attempt. In operation 355, the BS 320' may transmit a retrieve UE context failure message to the BS 320. The retrieve UE context failure message may include an encapsulated RRC release message. The RRC release message may include suspend configuration. In some other embodiments of the present disclosure, the BS 320' may determine to relocate the UE context, and may transmit the UE context of the UE 310 to the BS 320. In operation 361, the BS 220 may transmit the RRC release message to the UE 310.

In some embodiments of the present disclosure, the UE 310 may function as the WCD 110a in FIG. 1. The BS 320 and BS 320' may function as the BS 120a, BS 120b, or BS 120c in FIG. 1. In some example, referring to FIG. 1, from the perspective of RAN 121a (or BS 120a), the WCD 110a may be in an inactive mode. The WCD 110a may perform the above RNA update procedure via a SIM (e.g., SIM A) associated with RAN 121a. In some example, from the perspective of RAN 121b (or BS 120b), the WCD 110a may be in an inactive mode. The WCD 110a may perform the above RNA update procedure via a SIM (e.g., SIM B) associated with RAN 121b.

It should be appreciated by persons skilled in the art that the sequence of the operations in exemplary procedure 300 may be changed and some of the operations in exemplary procedure 300 may be eliminated or modified, without departing from the spirit and scope of the disclosure.

Figure 4:
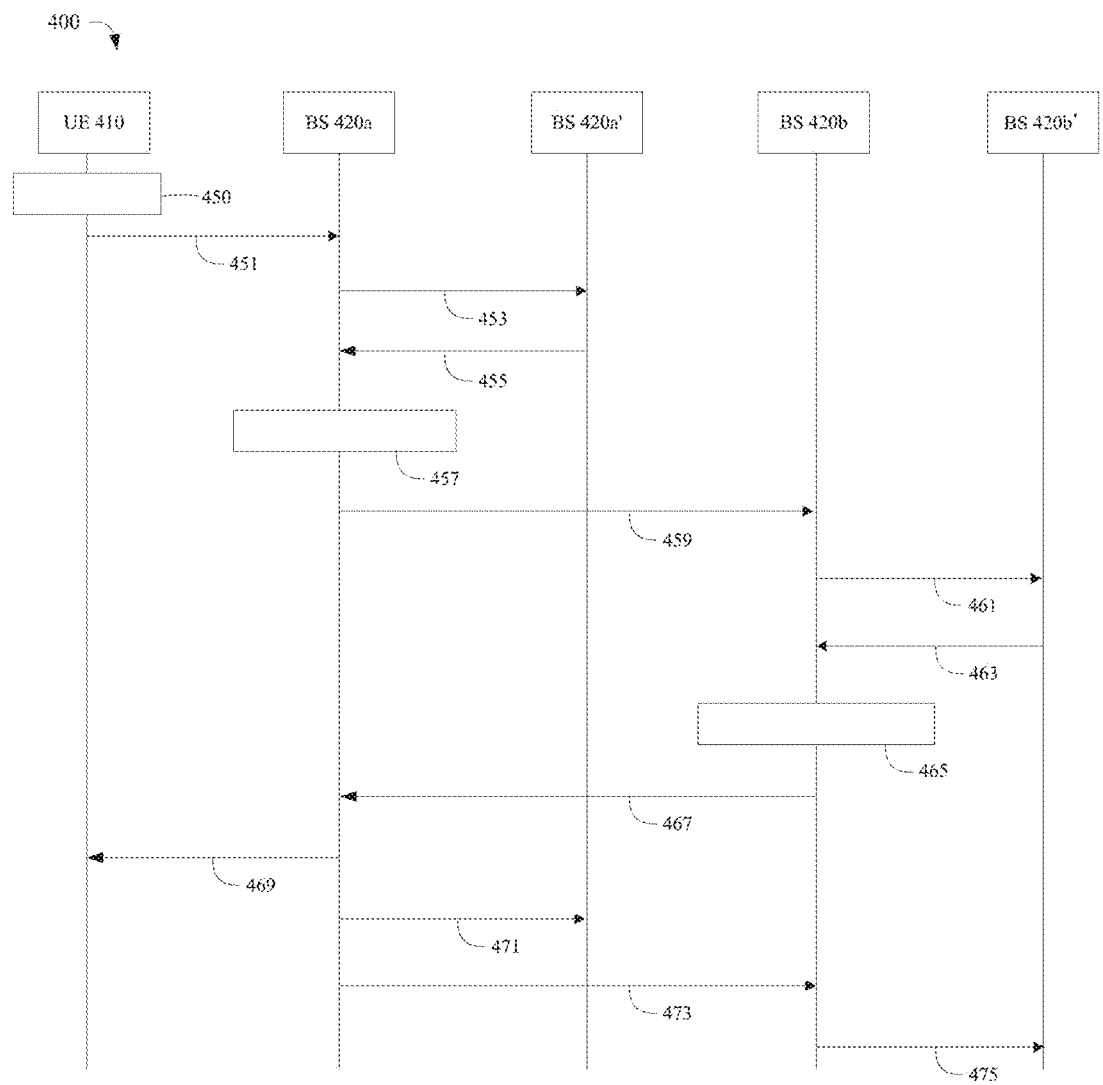
FIG. 4 illustrates a flow chart of an exemplary procedure of performing RAN-Based Notification Area update according to some embodiments of the present disclosure.

FIG. 4 illustrates a flow chart of an exemplary procedure 400 of performing RAN-Based Notification Area update according to some embodiments of the present disclosure.

The exemplary procedure 400 is applicable to the above-mentioned two types of RNA update, i.e., a RNA update triggered by a RNA change and a periodical RNA update, and other types of a RNA update. Details described in all the foregoing embodiments of the present disclosure are applicable for the embodiments shown in FIG. 4.

In FIG. 4, UE 410 may function as the WCD 110a shown in FIG. 1, the UE 210 shown in FIG. 2, or the UE 310 shown in FIG. 3. BS 420a, BS 420a', BS 420b and BS 420b' may function as the BS (e.g., BS 120a, BS 120b, or BS 120c) shown in FIG. 1, or the BS (e.g., BS 220 or BS 220') shown in FIG. 2, or the BS (e.g., BS 320 or BS 320') shown in FIG. 3.

Referring to FIG. 4, UE 410 may include a plurality of SIMs which support access to corresponding networks. For example, the UE 410 may be configured to access a RAN through a BS by a SIM (e.g., SIM A), and may be configured to access another RAN through another BS by another SIM (e.g., SIM B). At the beginning, the UE 410 may communicate with BS 420a' via SIM A, and may communication with BS 420b' via SIM B. As the UE 410 moves, the UE 410 may switch from the serving base station of SIM A (e.g., BS 420a', which is called the last serving base station of SIM A with respect to a new serving base station) to a new base station (e.g., BS 420a), and may switch from the serving base station of SIM B (e.g., BS 420b', which is called the last serving base station of SIM B with respect to a new serving base station) to a new base station (e.g., BS 420b).

The UE 410 may perform a RNA update procedure via SIM A periodically or when the new base station BS 420a is not within a configured RNA associated with SIM A. The UE 410 may perform another RNA update procedure via SIM B periodically or when the new base station BS 420b is not within a configured RNA associated with SIM B. As mentioned above, a configured RNA may indicate a list of cells or a list of RAN area IDs.

In some embodiments of the present disclosure, SIM A and SIM B may belong to the same PLMN. In this scenario, instead of performing RNA update procedures separately via SIM A and SIM B, the UE 410 may combine the RNA update procedures into one procedure. The benefit is that it can avoid UE interruption when the UE is not able to perform two RNA update procedures at the same time. Moreover, it can reduce signaling overhead since two or more RNA update procedures are combined into one procedure.

In operation 450, UE 410 may select one SIM from a plurality of SIMs (e.g., SIM A and SIM B) for performing RNA update procedure. In some embodiments of the present disclosure, the UE 410 may select a SIM based on the channel qualities associated with the plurality of SIMs. Channel quality associated with a SIM may refer to the channel quality between the SIM and the serving base station of the SIM. For example, the UE 410 may select a SIM according to the best channel quality among channel qualities associated with all SIMs. In some embodiments of the present disclosure, the UE 410 may select a SIM randomly. For example, UE 410 may select SIM A for performing a RNA update procedure according to the above criteria or other criteria that can be conceived of by persons skilled in the art.

In operation 451. UE 410 may transmit a resume request message via the selected SIM A to the base station (e.g., BS 420a) currently serving SIM A. The resume request message may be a RRC message. The resume request message may include RNA update information associated with SIM A, and additional RNA update information associated with unselected SIM(s) (e.g., SIM B) of the plurality of SIMs.

In some embodiments of the present disclosure, RNA update information associated with SIM A (i.e., the selected SIM) may include a resume ID of SIM A, which may be allocated by the last severing base station (e.g., BS 420a) of SIM A. The resume ID may be an Inactive-Radio Network Temporary Identifier (I-RNTI). In some embodiments of the present disclosure, RNA update information associated with SIM A may include an authentication token of SIM A. The authentication token may be resumeMAC-I for facilitating UE authentication. In some embodiments of the present disclosure, RNA update information associated with SIM A may include a resume cause associated with SIM A. In some examples, the resume cause may indicate a RNA update, which could be of any type (e.g., a RNA update triggered by a RNA change or a periodical RNA update). In some examples, the resume cause may indicate a periodical RNA update.

In some embodiments of the present disclosure, RNA update information associated with SIM B (i.e., a unselected SIM) may include a resume ID of SIM B, which may be allocated by the last severing base station (e.g., BS 420b') of SIM B. The resume ID may be an I-RNTI. In some embodiments of the present disclosure, RNA update information associated with SIM B may include an authentication token of SIM B. The authentication token may be resumeMAC-I. In some embodiments of the present disclosure, RNA update information associated with SIM B may include a serving cell ID of SIM B. The serving cell ID may be a physical cell identifier (PCI) or an Evolved Universal Terrestrial Radio Access Network (E-UTRAN) cell global identifier (ECGI). In some embodiments of the present disclosure, RNA update information associated with SIM B may include a resume cause associated with SIM B. In some examples, the resume cause may indicate a RNA update, which could be of any type (e.g., a RNA update triggered by a RNA change or a periodical RNA update). In some examples, the resume cause may indicate a periodical RNA update.

After receiving the RNA update information, BS 420a may resolve the identity of the last serving base station (e.g., BS 420a') of SIM A from the resume ID (e.g., I-RNTI) of SIM A. In operation 453, BS 420a may transmit a request for acquiring the UE context of UE 410 to BS 420a'. The request for acquiring the UE context may include the resume cause associated with SIM A received from UE 410. In operation 455, BS 420a may transmit the UE context of UE 410 to BS 420a. In operation 457, BS 420a may perform a path switch procedure for UE 410. The path switch procedure is similar to the path switch procedure described above with respect to FIG. 2, and thus is omitted herein.

BS 420a may determine the identity of the base station (e.g., BS 420b) currently serving SIM B based on the RNA update information (e.g., serving cell ID of SIM B) associated with SIM B. In operation 459, BS 420a may transmit a RNA update indication associated with SIM B to BS 420b. The RNA update indication associated with SIM B may include at least one of the following parameters: resume ID of SIM B, the authentication token of SIM B, and the resume cause associated with SIM B. BS 420a may obtain these parameters from the RNA update information associated with SIM B received from UE 410. In some embodiments of the present disclosure, the RNA update indication associated with SIM B may include serving cell ID of SIM B.

After receiving the RNA update indication, BS 420b may resolve the identity of the last serving base station (e.g., BS 420b') of SIM B from the resume ID (e.g., I-RNTI) of SIM B. In operation 461, BS 420b may transmit a request for acquiring the UE context of UE 410 to BS 420b'. The request for acquiring the UE context may include the resume cause associated with SIM B received from UE 410. In operation 463, BS 420b' may transmit the UE context of UE 410 to BS 420b. In operation 465, BS 420b may perform a path switch procedure for UE 410. The path switch procedure is similar to the one described above with respect to operation 457 of FIG. 4.

In operation 467, BS 420b may transmit a RNA update response to BS 420a. In some embodiments of the present disclosure, the RNA update response may include a suspend configuration for SIM B. The suspend configuration for SIM B may include at least one of the following: a full length of a resume ID of SIM B, a short length of the resume ID of SIM B, a paging cycle associated with SIM B, RNA information associated with SEM B, a timer value of a periodical RNA update timer associated with SIM B, and a next hop chaining count associated with SIM B. The resume ID (e.g., I-RNTI) of SIM B may be allocated by BS 420b. In some embodiments of the present disclosure, the RNA update response may include a connection setup indication for SIM B. The connection setup indication for SIM B may indicate SIM B to set up a connection with the network.

In operation 469, BS 420a may transmit a resume response message to UE 410, which may receive the message by SIM A. In some embodiments of the present disclosure, the resume response message may include a RRC release message associated with SIM A in the case that BS 420a determines to send UE 410 to an inactive state. In some embodiments of the present disclosure, the resume response message may include additional resume response information associated with SIM B. BS 420a may obtain the additional resume response information from the RNA update response received from BS 420b. In some other embodiments of the present disclosure, BS 420a may transmit the RRC release message associated with SIM A and the additional resume response information associated with SIM B separately to the UE 410.

In some embodiments of the present disclosure, the additional resume response information associated with SIM B may include a suspend configuration for SIM B. The suspend configuration for SIM B may include at least one of the following: a full length of a resume ID of SIM B, a short length of the resume ID of SIM B, a paging cycle associated with SIM B, RNA information associated with SIM B, a timer value of a periodical RNA update timer associated with SIM B, and a next hop chaining count associated with SIM B. In some embodiments of the present disclosure, the additional resume response information associated with SIM B may include a connection setup indication for SIM B. The connection setup indication for SIM B may indicate SIM B to set up a connection with the network.

In operation 471, BS 420a may transmit a UE context release message associated with SIM A to BS 420a'. The release message may trigger the release of UE resources for UE 410 at BS 420a'. In operation 473, BS 420a may transmit a UE context release message associated with SIM B to BS 420b. In operation 475, BS 420b may transmit or forward the UE context release message associated with SIM B to BS 420b'. The release message may trigger the release of UE resources for the UE 410 at the BS 420b'.

It should be appreciated by persons skilled in the art that the sequence of the operations in exemplary procedure 400 may be changed and some of the operations in exemplary procedure 400 may be eliminated or modified, without departing from the spirit and scope of the disclosure. For example, although exemplary procedure 400 shows that operation 459 is performed after operation 457, it is contemplated that operation 459 may be performed before operation 457 and after operation 451.

Figure 5:
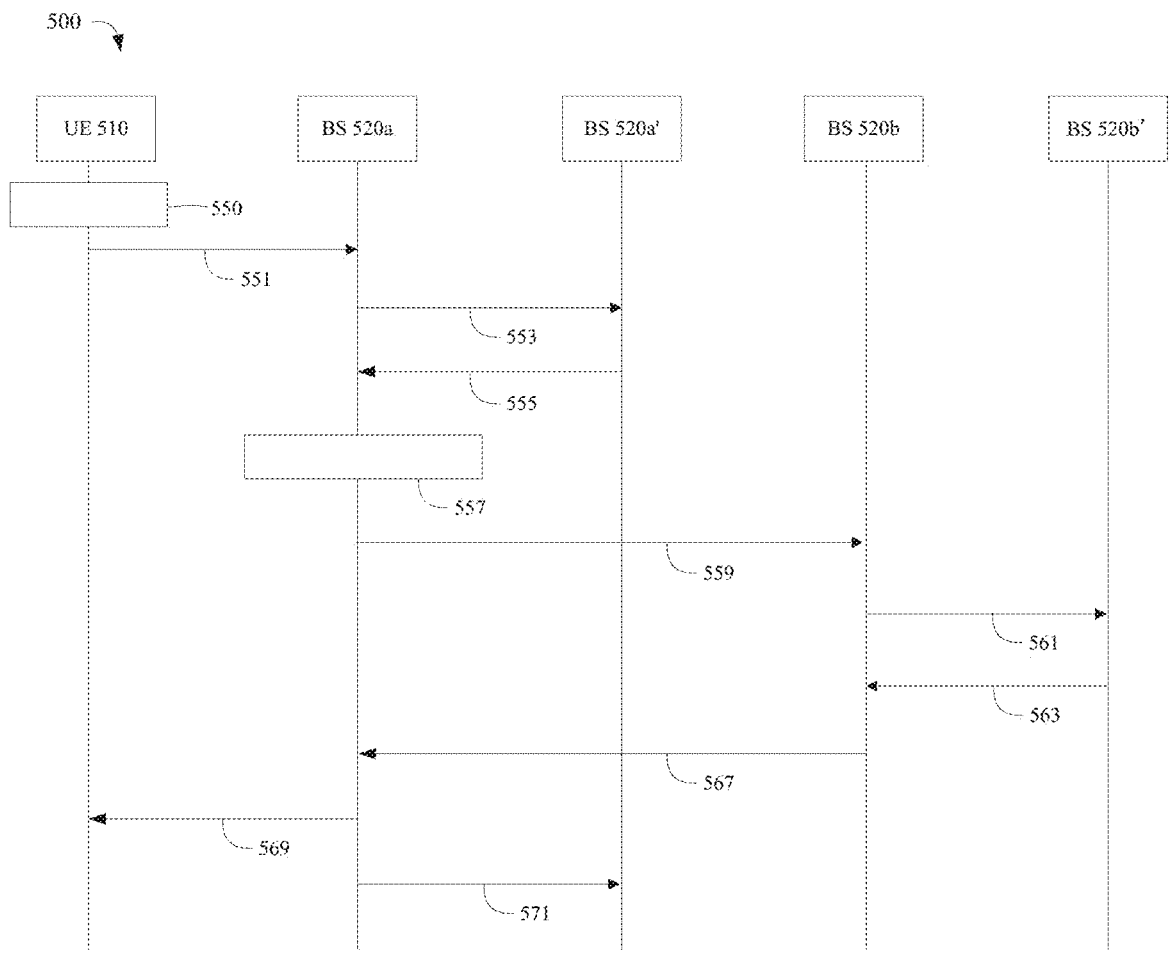
FIG. 5 illustrates a flow chart of an exemplary procedure of performing RAN-Based Notification Area update according to some embodiments of the present disclosure.

FIG. 5 illustrates a flow chart of an exemplary procedure 500 of performing RAN-Based Notification Area update according to some embodiments of the present disclosure. The exemplary procedure 500 is applicable to the above-mentioned two types of RNA update, i.e., a RNA update triggered by a RNA change and a periodical RNA update, and other types of a RNA update. Details described in all the foregoing embodiments of the present disclosure are applicable for the embodiments shown in FIG. 5.

In FIG. 5, UE 510 may function as the WCD 110a shown in FIG. 1, the UE 210 shown in FIG. 2, or the UE 310 shown in FIG. 3. BS 520a, BS 520a', BS 520b and BS 520b' may function as the BS (e.g., BS 120a, BS 120b, or BS 120c) shown in FIG. 1, or the BS (e.g., BS 220 or BS 220') shown in FIG. 2, or the BS (e.g., BS 320 or BS 320') shown in FIG. 3.

Referring to FIG. 5, UE 510 may include a plurality of SIMs which support access to corresponding networks. For example, the UE 510 may be configured to access a RAN through a BS by a SIM (e.g., SIM A), and may be configured to access another RAN through another BS by another SIM (e.g., SIM B). At the beginning, the UE 510 may communicate with BS 520a' via SIM A, and may communication with BS 520b' via SIM B. As the UE 510 moves, the UE 510 may switch from the serving base station of SIM A (e.g., BS 520a', which is called the last serving base station of SIM A with respect to a new serving base station) to a new base station (e.g., BS 520a), and may switch from the serving base station of SIM B (e.g., BS 520b', which is called the last serving base station of SIM B with respect to a new serving base station) to a new base station (e.g., BS 520b).

The UE 510 may perform a RNA update procedure via SIM A periodically or when the new base station BS 520a is not within a configured RNA associated with SIM A. The UE 510 may perform another RNA update procedure via SIM B periodically or when the new base station BS 520b is not within a configured RNA associated with SIM B. As mentioned above, a configured RNA may indicate a list of cells or a list of RAN area IDs.

In some embodiments of the present disclosure, SIM A and SIM B may belong to the same PLMN. In this scenario, instead of performing RNA update procedures separately via SIM A and SIM B, the UE 510 may combine the RNA update procedures into one procedure. This is beneficial because it can avoid UE interruption when the UE is not able to perform two RNA update procedures at the same time. Moreover, it can reduce signaling overhead since two or more RNA update procedures may be combined into one procedure.

In operation 550, UE 510 may select one SIM from a plurality of SIMs (e.g., SIM A and SIM B) for performing a RNA update procedure. In some embodiments of the present disclosure, the UE 510 may select a SIM based on the channel qualities associated with the plurality of SIMs. For example, the UE 510 may select a SIM according to the best channel quality. In some embodiments of the present disclosure, the UE 510 may select a SIM randomly. For example, UE 510 may select SIM A for performing the RNA update procedure according to the above criteria.

In operation 551, UE 510 may transmit a resume request message via the selected SIM A to the base station (e.g., BS 520a) currently serving SIM A. The resume request message may be a RRC message. The resume request message may include RNA update information associated with SIM A, and additional RNA update information associated with unselected SIM(s) (e.g., SIM B) of the plurality of SIMs.

In some embodiments of the present disclosure, RNA update information associated with SIM A (i.e., the selected SIM) may include a resume ID of SIM A, which may be allocated by the last severing base station (e.g., BS 520*a*') of SIM A. The resume ID may be an Inactive-Radio Network Temporary Identifier (I-RNTI).

In some embodiments of the present disclosure, RNA update information associated with SIM A may include an authentication token of SIM A. The authentication token may be resumeMAC-I for facilitating UE authentication. In some embodiments of the present disclosure, RNA update information associated with SIM A may include a resume cause associated with SIM A. In some examples, the resume cause may indicate a RNA update, which could be of any type (e.g., a RNA update triggered by a RNA change or a periodical RNA update). In some examples, the resume cause may indicate a periodical RNA update.

In some embodiments of the present disclosure, RNA update information associated with SIM B (i.e., a unselected SIM) may include a resume ID of SIM B, which may be allocated by the last severing base station (e.g., BS 520*b*') of SIM B. The resume ID may be an I-RNTI. In some embodiments of the present disclosure, RNA update information associated with SIM B may include an authentication token of SIM B. The authentication token may be resumeMAC-I. In some embodiments of the present disclosure, RNA update information associated with SIM B may include a serving cell ID of SIM B. The serving cell ID may be a physical cell identifier (PCI) or an Evolved Universal Terrestrial Radio Access Network (E-UTRAN) cell global identifier (ECGI). In some embodiments of the present disclosure, RNA update information associated with SIM B may include one of configured RNA information associated with SIM B and a periodical RNA update indicator associated with SIM B. The configured RNA information associated with SIM B may be broadcast or signaled by the last severing base station (e.g., BS 520*b*') of SIM B. The configured RNA information may indicate a list of cells or a list of RAN area IDs. The periodical RNA update indicator may indicate whether the RNA update associated with SIM B is a periodical RNA update or not. In some embodiments of the present disclosure, RNA update information associated with SIM B may include a resume cause associated with SIM B. In some examples, the resume cause may indicate a RNA update, which could be of any type (e.g., a RNA update triggered by a RNA change or a periodical RNA update). In some examples, the resume cause may indicate a periodical RNA update.

After receiving the RNA update information, BS 520*a* may resolve the identity of the last serving base station (e.g., BS 520*a*') of SIM A from the resume ID (e.g., I-RNTI) of SIM A. In operation 553, BS 520*a* may transmit a request for acquiring the UE context of UE 510 to BS 520*a*'. The request for acquiring the UE context may include the resume cause associated with SIM A received from UE 510. In operation 555, BS 520*a*' may transmit the UE context of UE 510 to BS 520*a*. In operation 557. BS 520*a* may perform a path switch procedure for UE 510. The path switch procedure is similar to the one described above with respect to FIG. 2, and thus is omitted herein.

BS 520*a* may determine the identity of the base station (e.g., BS 520*b*) currently serving SIM B based on the RNA update information (e.g., serving cell ID of SIM B) associated with SIM B. In operation 559, BS 520*a* may transmit a RNA update indication associated with SIM B to BS 520*b*. The RNA update indication associated with SIM B may include at least one of the following parameters: resume ID of SIM B, the authentication token of SIM B, the resume cause associated with SIM B, and the configured RNA information (or the periodical RNA update indicator). BS 520*a* may obtain these parameters from the RNA update information associated with SIM B received from UE 510. In some embodiments of the present disclosure, the RNA update indication associated with SIM B may include serving cell ID of SIM B.

After receiving the RNA update indication, BS 520*b* may resolve the identity of the last serving base station (e.g., BS 520*b*') of SIM B from the resume ID (e.g., I-RNTI) of SIM B. BS 520*b* may also determine whether the RNA update associated with SIM B is triggered by a RNA change or is a periodical RNA update based on the RNA update indication associated with SIM B (e.g., the configured RNA information or the periodical RNA update indicator). For example, BS 520*b* may determine whether the RNA update associated with SIM B is a triggered by a RNA change or is a periodical RNA update by determining whether the cell ID of BS 520*b* is included in the configured RNA information.

In operation 561, BS 520*b* may transmit a request for acquiring the UE context of UE 510 to BS 520*b*'. The request for acquiring the UE context may include the resume cause associated with SIM B received from UE 510. In operation 563, BS 520*b*' may transmit a retrieve UE context failure message to BS 520*b* in the case that the BS 520*b*' determines not to relocate the UE context of UE 510. In some other embodiments of the present disclosure. BS 520*b*' may determine to relocate the UE context, and may transmit the UE context of the UE 510 to the BS 520*b*. However, compared to the embodiments where the UE context is not relocated, signaling overhead may be increased in these embodiments.

In operation 567, BS 520*b* may transmit a RNA update response to BS 520*a*. In some embodiments of the present disclosure, the RNA update response may include a suspend configuration for SIM B. The suspend configuration for SIM B may include at least one of the following: a full length of a resume ID of SIM B, a short length of the resume ID of SIM B, a paging cycle associated with SIM B, RNA information associated with SIM B, a timer value of a periodical RNA update timer associated with SIM B, and a next hop chaining count associated with SIM B. The resume ID (e.g., I-RNTI) of SIM B may be allocated by BS 520*b*. In some embodiments of the present disclosure, the RNA update response may include a connection setup indication for SIM B. The connection setup indication for SIM B may indicate SIM B to set up a connection with the network.

In operation 569, BS 520*a* may transmit a resume response message to UE 510, which may receive the message by SIM A. In some embodiments of the present disclosure, the resume response message may include a RRC release message associated with SIM A in the case that BS 520*a* determines to send UE 510 to an inactive state. In some embodiments of the present disclosure, the resume response message may include additional resume response information associated with SIM B. BS 520*a* may obtain the additional resume response information from the RNA update response received from BS 520*b*. In some other embodiments of the present disclosure, BS 520*a* may transmit the RRC release message associated with SIM A and the additional resume response information associated with SIM B separately to the UE 510.

In some embodiments of the present disclosure, the additional resume response information associated with SIM B may include a suspend configuration for SIM B. The suspend configuration for SIM B may include at least one of the following: a full length of a resume ID of SIM B, a short length of the resume ID of SIM B, a paging cycle associated with SIM B, RNA information associated with SIM B, a timer value of a periodical RNA update timer associated with SIM B, and a next hop chaining count associated with SIM B. In some embodiments of the present disclosure, the additional resume response information associated with SIM B may include a connection setup indication for SIM B. The connection setup indication for SIM B may indicate SIM B to set up a connection with the network.

In operation 571, BS 520a may transmit a UE context release message associated with SIM A to BS 520a'. The release message may trigger the release of UE resources for UE 510 at BS 520a'.

It should be appreciated by persons skilled in the art that the sequence of the operations in exemplary procedure 500 may be changed and some of the operations in exemplary procedure 500 may be eliminated or modified, without departing from the spirit and scope of the disclosure. For example, although exemplary procedure 500 shows that operation 559 is performed after operation 557, it is contemplated that operation 559 may be performed before operation 557 and after operation 551.

Figure 6:
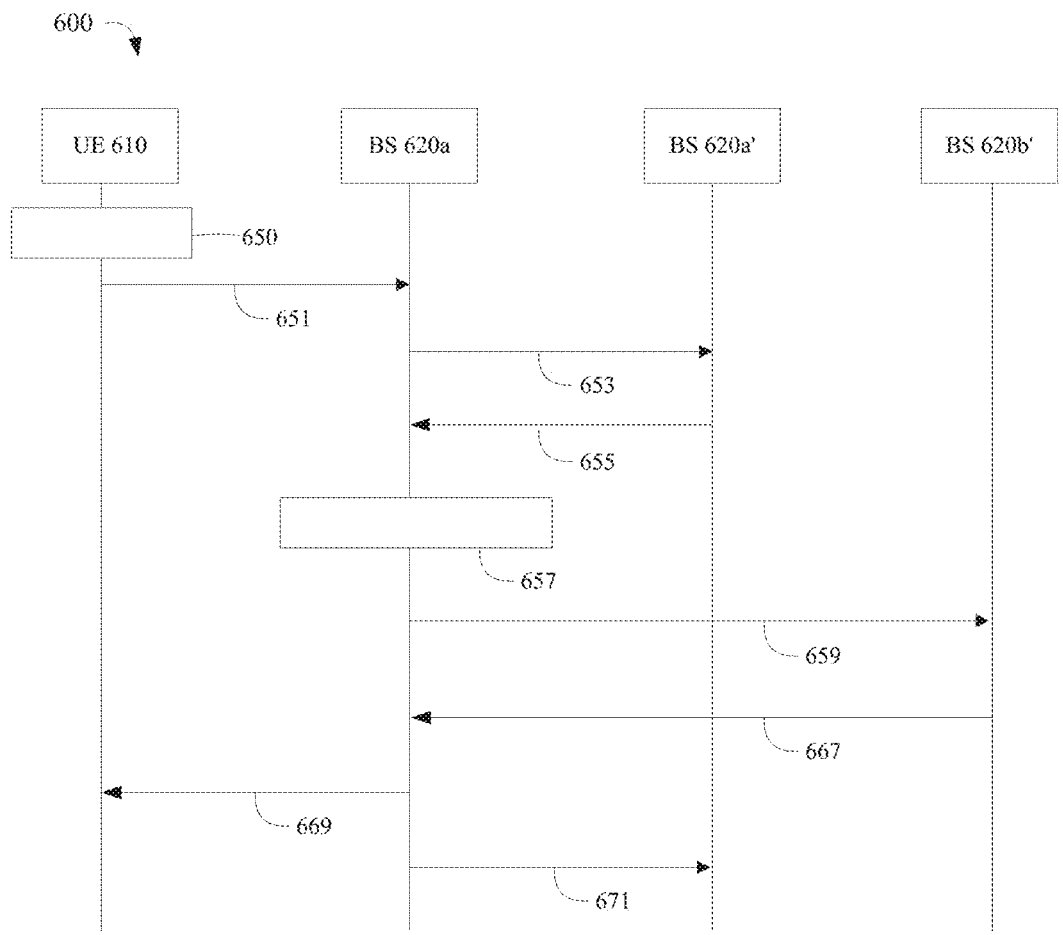
FIG. 6 illustrates a flow chart of an exemplary procedure of performing RAN-Based Notification Area update according to some embodiments of the present disclosure.

FIG. 6 illustrates a flow chart of an exemplary procedure 600 of performing RAN-Based Notification Area update according to some embodiments of the present disclosure. The exemplary procedure 600 is applicable to the above-mentioned two types of RNA update, i.e., a RNA update triggered by a RNA change and a periodical RNA update, and other types of a RNA update. Details described in all the foregoing embodiments of the present disclosure are applicable for the embodiments shown in FIG. 6.

In FIG. 6, UE 610 may function as the WCD 110a shown in FIG. 1, the UE 210 shown in FIG. 2, or the UE 310 shown in FIG. 3. BS 620a, BS 620a, and BS 620b' may function as the BS (e.g., BS 120a, BS 120b, or BS 120c) shown in FIG. 1, or the BS (e.g., BS 220 or BS 220) shown in FIG. 2, or the BS (e.g., BS 320 or BS 320') shown in FIG. 3.

Referring to FIG. 6, UE 610 may include a plurality of SIMs which support access to corresponding networks. For example, the UE 610 may be configured to access a RAN through a BS by a SIM (e.g., SIM A), and may be configured to access another RAN through another BS by another SIM (e.g., SIM B). At the beginning, the UE 610 may communicate with BS 620a' via SIM A, and may communication with BS 620b' via SIM B. As the UE 610 moves, the LIE 610 may switch from the serving base station of SIM A (e.g., BS 620a, which is called the last serving base station of SIM A with respect to a new serving base station) to a new base station (e.g., BS 620a), and may switch from the serving base station of SIM B (e.g., BS 620b', which is called the last serving base station of SIM B with respect to a new serving base station) to a new base station (not shown in FIG. 6).

The UE 610 may perform a RNA update procedure via SIM A periodically or when the new base station BS 620a is not within a configured RNA associated with SIM A. The UE 610 may perform another RNA update procedure via SIM B periodically or when the new base station serving SIM B is not within a configured RNA associated with SIM B. As mentioned above, a configured RNA may indicate a list of cells or a list of RAN area IDs.

In some embodiments of the present disclosure, SIM A and SIM B may belong to the same PLMN. In this scenario, instead of performing RNA update procedures separately via SIM A and SIM B, the UE 610 may combine the RNA update procedures into one procedure. This is beneficial because it can avoid UE interruption when the UE is not able to perform two RNA update procedures at the same time. Moreover, it can reduce signaling overhead since two or more RNA update procedures may be combined into one procedure.

In operation 650, UE 610 may select one SIM from a plurality of SIMs (e.g., SIM A and SIM B) for performing a RNA update procedure. In some embodiments of the present disclosure, the UE 610 may select a SIM based on the channel qualities associated with the plurality of SIMs. For example, the UE 610 may select a SIM according to the best channel quality. In some embodiments of the present disclosure, the UE 610 may select a SIM randomly. For example, UE 610 may select SIM A for performing the RNA update procedure according to the above criteria.

In operation 651, UE 610 may transmit a resume request message via the selected SIM A to the base station (e.g., BS 620a) currently serving SIM A. The resume request message may be a RRC message. The resume request message may include RNA update information associated with SIM A, and additional RNA update information associated with unselected SIM(s) (e.g., SIM B) of the plurality of SIMs.

In some embodiments of the present disclosure, RNA update information associated with SIM A (i.e., the selected SIM) may include a resume ID of SIM A, which may be allocated by the last severing base station (e.g., BS 620a') of SIM A. The resume ID may be an Inactive-Radio Network Temporary Identifier (I-RNTI). In some embodiments of the present disclosure, RNA update information associated with SIM A may include an authentication token of SIM A. The authentication token may be resumeMAC-I for facilitating UE authentication. In some embodiments of the present disclosure, RNA update information associated with SIM A may include a resume cause associated with SIM A. In some examples, the resume cause may indicate a RNA update, which could be of any type (e.g., a RNA update triggered by a RNA change or a periodical RNA update). In some examples, the resume cause may indicate a periodical RNA update.

In some embodiments of the present disclosure, RNA update information associated with SIM B (i.e., a unselected SIM) may include a resume ID of SIM B, which may be allocated by the last severing base station (e.g., BS 620b') of SIM B. The resume ID may be an I-RNTI some embodiments of the present disclosure, RNA update information associated with SIM B may include an authentication token of SIM B. The authentication token may be resumeMAC-I. In some embodiments of the present disclosure, RNA update information associated with SIM B may include a periodical RNA update indicator associated with SIM B. The periodical RNA update indicator may indicate whether the RNA update associated with SIM B is a periodical RNA update or not. In some embodiments of the present disclosure, RNA update information associated with SIM B may include a resume cause associated with SIM B. In some examples, the resume cause may indicate a RNA update, which could be of any type (e.g., a RNA update triggered by a RNA change or a periodical RNA update). In some examples, the resume cause may indicate a periodical RNA update.

After receiving the RNA update information, BS 620a may resolve the identity of the last serving base station (e.g., BS 620a') of SIM A from the resume ID (e.g., I-RNTI) of SIM A. In operation 653, BS 620a may transmit a request for acquiring the UE context of UE 610 to BS 620a'. The request for acquiring the UE context may include the resume cause associated with SIM A received from UE 610. In operation

655, BS 620a' may transmit the UE context of UE 610 to BS 620a. In operation 657, BS 620a may perform a path switch procedure for UE 610. The path switch procedure is similar to the one described above with respect to FIG. 2, and thus is omitted herein.

BS 620a may determine the identity of the base station (e.g., BS 620b') last serving SIM B based on the RNA update information (e.g., resume ID of SIM B) associated with SIM B. In operation 659, BS 620a may transmit a RNA update indication associated with SIM B to BS 620b'. Transmitting the RNA update indication associated with SIM B to the last serving base station of SIM B, instead of the serving base station of SIM B, can reduce signaling overhead since the serving base station of SIM B may not be involved in the RNA update procedure for SIM B. The RNA update indication associated with SIM B may include the RNA update information associated with SIM B received from UE 610. For example, the RNA update indication associated with SIM B may include at least one of the following parameters: resume ID of SIM B, the authentication token of SIM B, the resume cause associated with SIM B, and the periodical RNA update indicator.

In operation 667, BS 620b' may transmit a RNA update response to BS 620a. In some embodiments of the present disclosure, the RNA update response may include a suspend configuration for SIM B. The suspend configuration for SIM B may include at least one of the following: a full length of a resume ID of SIM B, a short length of the resume ID of SIM B, a paging cycle associated with SIM B, RNA information associated with SIM B, a timer value of a periodical RNA update timer associated with SIM B, and a next hop chaining count associated with SIM B. The resume ID (e.g., I-RNTI) of SIM B may be allocated by BS 620b'. In some embodiments of the present disclosure, the RNA update response may include a connection setup indication for SIM B. The connection setup indication for SIM B may indicate SIM B to set up a connection with the network.

In operation 669, BS 620a may transmit a resume response message to UE 610, which may receive the message by SIM A. In some embodiments of the present disclosure, the resume response message may include a RRC release message associated with SIM A in the case that BS 620a determines to send UE 610 to an inactive state. In some embodiments of the present disclosure, the resume response message may include additional resume response information associated with SIM B. BS 620a may obtain the additional resume response information from the RNA update response received from BS 620b'. In some other embodiments of the present disclosure, BS 620a may transmit the RRC release message associated with SIM A and the additional resume response information associated with SIM B separately to the UE 610.

In some embodiments of the present disclosure, the additional resume response information associated with SIM B may include a suspend configuration for SIM B. The suspend configuration for SIM B may include at least one of the following: a full length of a resume ID of SIM B, a short length of the resume ID of SIM B, a paging cycle associated with SIM B, RNA information associated with SIM B, a timer value of a periodical RNA update timer associated with SIM B, and a next hop chaining count associated with SIM B. In some embodiments of the present disclosure, the additional resume response information associated with SIM B may include a connection setup indication for SIM B. The connection setup indication for SIM B may indicate SIM B to set up a connection with the network.

In operation 671, BS 620a may transmit a UE context release message associated with SIM A to BS 620a'. The release message may trigger the release of UE resources for UE 610 at BS 620a'.

It should be appreciated by persons skilled in the art that the sequence of the operations in exemplary procedure 600 may be changed and some of the operations in exemplary procedure 600 may be eliminated or modified, without departing from the spirit and scope of the disclosure. For example, although exemplary procedure 600 shows that operation 659 is performed after operation 657, it is contemplated that operation 659 may be performed before operation 657 and after operation 651.

Figure 7:
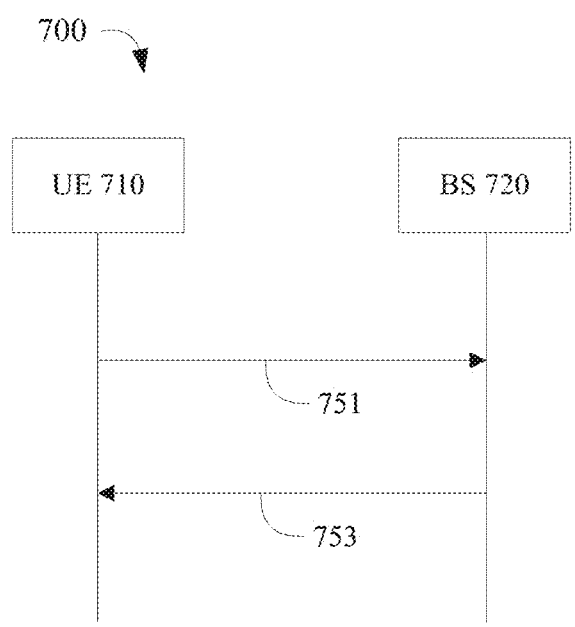
FIG. 7 illustrates a flow chart of an exemplary procedure of performing communications between a UE and a BS according to some embodiments of the present disclosure.

FIG. 7 illustrates a flow chart of an exemplary procedure 700 of performing communications between a UE and a BS according to some embodiments of the present disclosure. Details described in all the foregoing embodiments of the present disclosure are applicable for the embodiments shown in FIG. 7.

As mentioned above, a RNA update collision may occur at a multi-SIM wireless communication device when two or more subscription services try to use the same RF resources to perform RNA updates with their respective wireless networks at the same time. The exemplary procedure 700 may be employed to eliminate the RNA update collision, especially, a collision of periodical RNA updates associated with different SIMs.

In FIG. 7, BS 720 may function as the BS (e.g., BS 120a, BS 120b, or BS 120c) shown in FIG. 1, or the BS (e.g., BS 220 or BS 220') shown in FIG. 2, or the BS (e.g., BS 320 or BS 320') shown in FIG. 3. UE 710 may function as the WCD 110a shown in FIG. 1, the UE 210 shown in FIG. 2, or the UE 310 shown in FIG. 3. UE 710 may include a plurality of SIMs which support access to corresponding networks. For example, UE 710 may be configured to access a RAN through a BS by a SIM (e.g., SIM A), and may be configured to access another RAN through another BS by another SIM (e.g., SIM B).

In operation 751, UE 710 may transmit an assistant information report to BS 720. In some embodiments of the present disclosure, one SIM (e.g., SIM B) of the plurality of SIMs of UE 710 may be in a connected state while other SIMs (e.g., SIM A) may be in an inactive state. In these embodiments, UE 710 may transmit the assistant information report via SIM B to the serving base station of SIM B. The assistant information report may include time information of a periodical RNA update associated with SIM A (i.e., SIM(s) that is in an inactive state). In some embodiments of the present disclosure, the time information may comprise a periodicity value of a periodical RNA update tinier associated with SIM A, and the starting time of the periodical RNA update tinier associated with SIM A.

After receiving the time information associated with SIM A, when BS 720 configures SIM B to enter into an inactive state, BS 720 may take the time information associated with SIM A into consideration to avoid RNA update collision between SIM A and SIM B (if any). For example, in operation 753, BS 720 may transmit a RRC release message to UE 710 when BS 720 configures SIM B to enter into an inactive state. The RRC release message may include a suspend configuration for SIM B. In some embodiments of the present disclosure, the suspend configuration may comprise a periodicity value of a periodical RNA update timer associated with SIM B. The periodicity value of the periodical RNA update timer associated with SIM B is determined based on the time information.

Figure 7A:
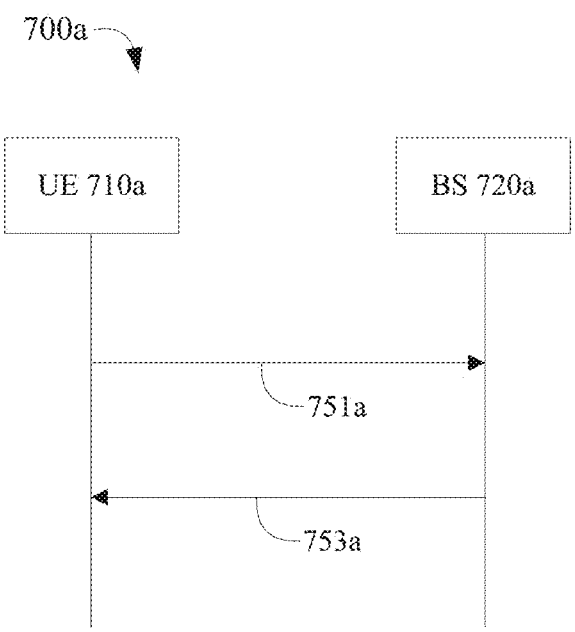
FIG. 7A illustrates a flow chart of an exemplary procedure of performing communications between a UE and a BS according to some embodiments of the present disclosure.

FIG. 7A illustrates a flow chart of an exemplary procedure 700a of performing communications between a UE and a BS according to sonic embodiments of the present disclosure.

The above descriptions regarding the UE 710 and BS 720 in FIG. 7A can also be applied to the wireless communication system in FIG. 7A except that at the beginning, all of the plurality of SIMs (e.g., both SIM A and SIM B) of UE 710a may be in an inactive state. For example, the descriptions regarding the assistant information report and the RRC release message in FIG. 7 are applicable for the embodiments shown in FIG. 7A.

UE 710a may select one SIM (e.g., SIM B) from the plurality of SIMs SIM A and SIM B) for transmitting the assistant information report. The selection of the SIM may be based on criteria as mentioned above or other criteria that can be conceived of by persons skilled in the art. UE 710a may switch the selected SIM B from the inactive state to a connected state. UE 710a may then, in operation 751a, transmit the assistant information report via SIM B to the serving base station (e.g., BS 720a) of SIM B.

After receiving the assistant information report, BS 720a may reconfigure the suspend configuration for SIM B to avoid RNA update collision between SIM A and SIM B (if any). For example, BS 720a may reconfigure the periodicity value of the periodical RNA update tinier associated with SIM B based on the assistant information report. BS 720a may, in operation 753a, transmit the reconfigured suspend configuration for SIM B to UE 710a. The reconfigured suspend configuration may be included in a RRC release message.

In some embodiments of the present disclosure, time information of periodical RNA update(s) may be exchanged between BSs via, for example, Xn interface, instead of a UE and its serving BS(s). For example, in the case that the subscription services enabled by two or more SIMs of a plurality of SIMs of a UE are provided by the same Mobile Network Operator (MNO) (also known as "intra-MNO), the serving base stations of the two or more SIMS may exchange time information of the periodical RNA updates associated with the two or more SIMs, to avoid RNA update collision(s) between the two or more SIMs (if any).

Another solution for eliminating or alleviating RNA update collision in a wireless communication system is to postpone of one or more of two or more simultaneous RNA updates at a wireless communication device. However, postponing RNA updates may be disadvantageous because the network may consider that the wireless communication device has left its coverage area if a RNA update is not performed within a certain time after a corresponding update timer expires. Therefore, a solution for postponing the RNA updates while avoiding the above disadvantage is required. For example, to avoid the above disadvantage brought by the postponement of the RNA updates, the network may indicate to a wireless communication device how long a RNA update is allowed to be postponed.

Figure 8:
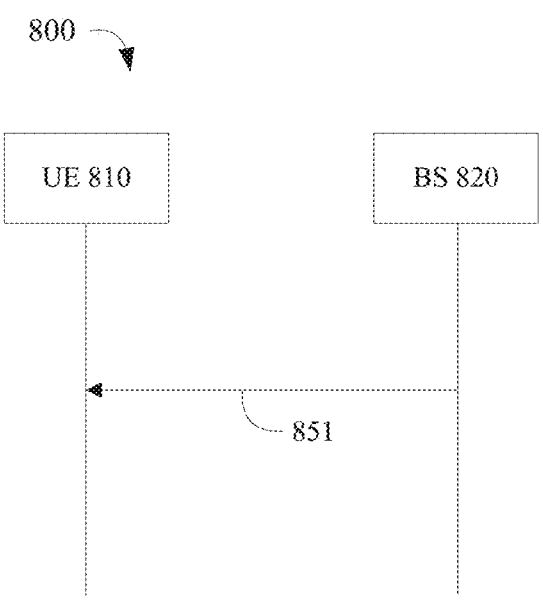
FIG. 8 illustrates a flow chart of an exemplary procedure of performing communications between a UE and a BS according to some embodiments of the present disclosure.

FIG. 8 illustrates a flow chart of an exemplary procedure 800 of performing communications between a UE and a BS according to some embodiments of the present disclosure. The exemplary procedure 800 may be employed to facilitate the postponement of the RNA updates. Details described in all the foregoing embodiments of the present disclosure are applicable for the embodiments shown in FIG. 8.

In FIG. 8, BS 820 may function as the BS (e.g., BS 120a, BS 120b, or BS 120c) shown in FIG. 1, or the BS (e.g., BS 220 or BS 220) shown in FIG. 2, or the BS (e.g., BS 320 or BS 320') shown in FIG. 3. UE 810 may function as the WCD 110a shown in FIG. 1, the UE 210 shown in FIG. 2, or the UE 310 shown in FIG. 3.

Referring to FIG. 8, UE 810 may include a plurality of SIMs (e.g., SIM A and SIM B) which support access to corresponding networks. At the beginning, at least one SIM (e.g., SIM A) of the plurality of SIMs of UE 810 may be in a connected state.

In operation 851, UE 810 may receive a RRC release message including suspend configuration for SIM A from the serving base station of SIM A (e.g., BS 820). The suspend configuration may include a time value that a periodical RNA update associated with SIM A is allowed to be postponed. The time value may be included in an Information Element (IE) of the suspend configuration. UE 810 may switch SIM A from the connected state to an inactive state based on the suspend configuration. For example, UE 810 may configure that after the periodical RNA update timer associated with SIM A expires, it can be postponed up to the time value indicated in the suspend configuration.

In some embodiments of the present disclosure, the serving base station of SIM B of UE 810 may transmit a similar suspend configuration for SIM B to UE 810, allowing the postponement of the periodical RNA update associated with SIM B.

In the case two or more SIMs of UE 810 try to perform periodical RNA updates simultaneously. UE 810 may determine to postpone one or more of the periodical RNA updates based on the time value(s) that the corresponding periodical RNA update(s) are allowed to be postponed.

Figure 9:
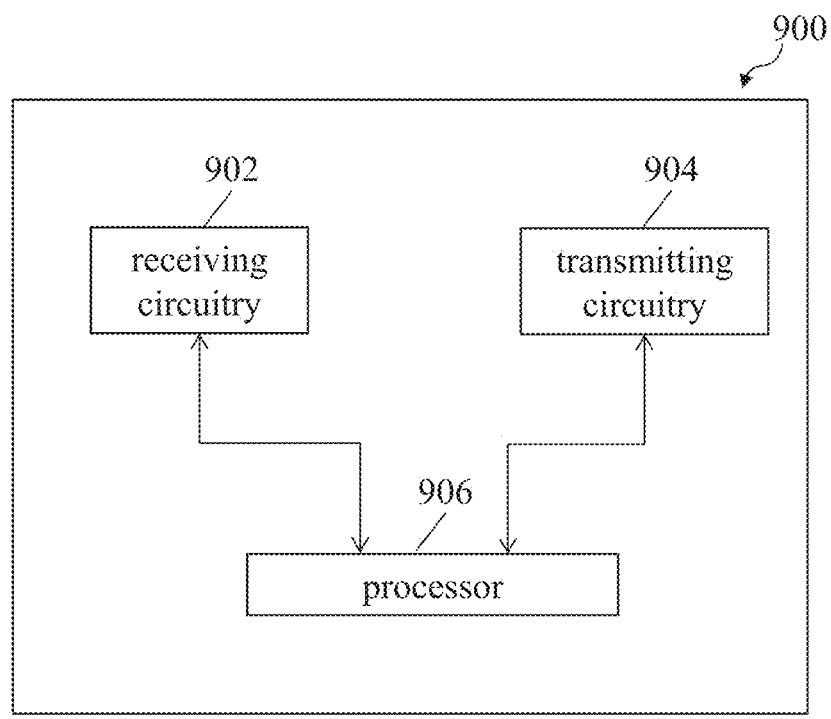
FIG. 9 illustrates an example block diagram of an apparatus according to some embodiments of the present disclosure.

FIG. 9 illustrates an example block diagram of an apparatus 900 according to some embodiments of the present disclosure.

As shown in FIG. 9, the apparatus 900 may include at least one non-transitory computer-readable medium (not illustrated in FIG. 9), a receiving circuitry 902, a transmitting circuitry 904, and a processor 906 coupled to the non-transitory computer-readable medium (not illustrated in FIG. 9), the receiving circuitry 902 and the transmitting circuitry 904. The apparatus 900 may be a BS, a CN component (e.g., a MME or an AMF), or a WCD (e.g., a UE).

Although in this figure, elements such as processor 906, transmitting circuitry 904, and receiving circuitry 902 are described in the singular, the plural is contemplated unless limitation to the singular is explicitly stated. In some embodiments of the present disclosure, the receiving circuitry 902 and the transmitting circuitry 904 are combined into a single device, such as a transceiver. In certain embodiments of the present disclosure, the apparatus 900 may further include an input device, a memory, and/or other components.

In some embodiments of the present disclosure, the non-transitory computer-readable medium may have stored thereon computer-executable instructions to cause a processor to implement the method with respect to the communication device as described above. For example, the computer-executable instructions, when executed, cause the processor 906 interacting with receiving circuitry 902 and transmitting circuitry 904, to perform the operations with respect to the WCD depicted with respect to FIG. 1 and the UEs depicted with respect to FIGS. 2-8.

In some embodiments of the present disclosure, the non-transitory computer-readable medium may have stored thereon computer-executable instructions to cause a processor to implement the method with respect to the BS as described above. For example, the computer-executable instructions, when executed, cause the processor 906 interacting with receiving circuitry 902 and transmitting circuitry 904, to perform the operations with respect to the BSs depicted in FIGS. 1-8.

In some embodiments of the present disclosure, the non-transitory computer-readable medium may have stored thereon computer-executable instructions to cause a processor to implement the method with respect to the CN components as described above. For example, the computer-executable instructions, when executed, cause the processor 906 interacting with receiving circuitry 902 and transmitting circuitry 904, to perform the operations with respect to the CN components depicted in FIGS. 1, 2, and 4-6.

Those having ordinary skill in the art would understand that the operations of a method described in connection with the aspects disclosed herein may be embodied directly in hardware, in a software module executed by a processor, or in a combination of the two. A software module may reside in RAM memory, flash memory, ROM memory, EPROM memory, EEPROM memory, a register, a hard disk, a removable disk, a CD-ROM, or any other form of storage medium known in the art. Additionally, in some aspects, the operations of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including".

The following is what is claimed:

1. A method, comprising:
   selecting a first subscriber identity module from a plurality of subscriber identity modules of a user equipment, wherein the plurality of subscriber identity modules are in an inactive state; and
   transmitting a resume request message via the first subscriber identity module, wherein the resume request message comprises first radio access network (RAN)-based notification area (RNA) update information associated with the first subscriber identity module and second RNA update information associated with a second subscriber identity module of the plurality of subscriber identity modules.

2. The method of claim 1, wherein the first subscriber identity module is selected based on the first subscriber identity module having the best channel quality among channel qualities associated with the plurality of subscriber identity modules.

3. The method of claim 1, wherein the second RNA update information comprises at least one of the following:
   a resume ID of the second subscriber identity module;
   an authentication token of the second subscriber identity module;
   a serving cell ID of the second subscriber identity module; or
   a resume cause associated with the second subscriber identity module.

4. The method of claim 3, wherein the serving cell ID is physical cell identifier (PCI) or evolved universal terrestrial radio access network (E-UTRAN) cell global identifier (ECGI).

5. The method of claim 3, wherein the second RNA update information further comprises one of the following:
   configured RNA information associated with the second subscriber identity module; or
   a periodical RNA update indicator associated with the second subscriber identity module.

6. The method of claim 3, wherein the resume cause indicates RNA update or periodical RNA update.

7. The method of claim 1, wherein the second RNA update information comprises at least one of the following:
   a resume ID of the second subscriber identity module;
   an authentication token of the second subscriber identity module;
   a periodical RNA update indicator associated with the second subscriber identity module; or
   a resume cause associated with the second subscriber identity module.

8. The method of claim 1, further comprising:
   receiving a resume response message via the first subscriber identity module, wherein the resume response message comprises second resume response information associated with the second subscriber identity module.

9. The method of claim 8, wherein the second resume response information comprises a suspend configuration for the second subscriber identity module or a connection setup indication for the second subscriber identity module.

10. The method of claim 9, wherein the suspend configuration for the second subscriber identity module comprises at least one of the following:
    a full length of a resume ID of the second subscriber identity module;
    a short length of the resume ID of the second subscriber identity module;
    a paging cycle associated with the second subscriber identity module;
    RNA information associated with the second subscriber identity module;
    a timer value of a periodical RNA update timer associated with the second subscriber identity module; or
    next hop chaining count associated with the second subscriber identity module.

11. The method of claim 10, wherein the resume ID is allocated by a serving base station of the second subscriber identity module or the last serving base station of the second subscriber identity module.

12. An apparatus, comprising:
a receiving circuitry;
a transmitting circuitry; and
a processor coupled to the receiving circuitry and the transmitting circuitry configured to cause the apparatus to:
  select a first subscriber identity module from a plurality of subscriber identity modules of the apparatus, the plurality of subscriber identity modules are in an inactive state; and
  transmit a resume request message via the first subscriber identity module, the resume request message comprises first radio access network RAN)-based notification area (RNA) update information associated with the first subscriber identity module and second RNA update information associated with a second subscriber identity module of the plurality of subscriber identity modules.

13. An apparatus, comprising:
a receiving circuitry;
a transmitting circuitry; and
a processor coupled to the receiving circuitry and the transmitting circuitry configured to cause the apparatus to receive a resume request message from a user equipment (UE), the resume request message comprising first radio access network (RAN)-based notification area (RNA) update information associated with a first subscriber identity module of the UE served by a first base station and second RNA update information associated with a second subscriber identity module of the UE.

14. The apparatus of claim 13, wherein the processor coupled to the receiving circuitry and the transmitting circuitry is configured to cause the apparatus to:
  transmit a RNA update indication associated with the second subscriber identity module to a second base station currently serving the second subscriber identity module; and
  receive a RNA update response from the second base station.

15. The apparatus of claim 14, wherein the second RNA update information comprises at least one of the following:
  a resume ID of the second subscriber identity module;
  an authentication token of the second subscriber identity module;
  a serving cell ID of the second subscriber identity module; or
  a resume cause associated with the second subscriber identity module.

16. The apparatus of claim 15, wherein the serving cell ID is a physical cell identifier (PCI) or an evolved universal terrestrial radio access network (E-UTRAN) cell global identifier (ECGI).

17. The apparatus of claim 15, wherein the RNA update indication associated with the second subscriber identity module comprises at least one of the following:
  the resume ID of the second subscriber identity module;
  the authentication token of the second subscriber identity module; or
  the resume cause associated with the second subscriber identity module.

18. The apparatus of claim 15, wherein the second RNA update information further comprises one of the following:
  configured RNA information associated with the second subscriber identity module; or
  a periodical RNA update indicator associated with the second subscriber identity module.

19. The apparatus of claim 13, wherein the processor coupled to the receiving circuitry and the transmitting circuitry is configured to cause the apparatus to
  transmit a RNA update indication associated with the second subscriber identity module to a third base station last serving the second subscriber identity module; and
  receive a RNA update response from the third base station.

20. The apparatus of claim 19, wherein the second RNA update information comprises at least one of the following:
  a resume ID of the second subscriber identity module;
  an authentication token of the second subscriber identity module;
  a periodical RNA update indicator associated with the second subscriber identity module; or
  a resume cause associated with the second subscriber identity module.

* * * * *